Figure 1:
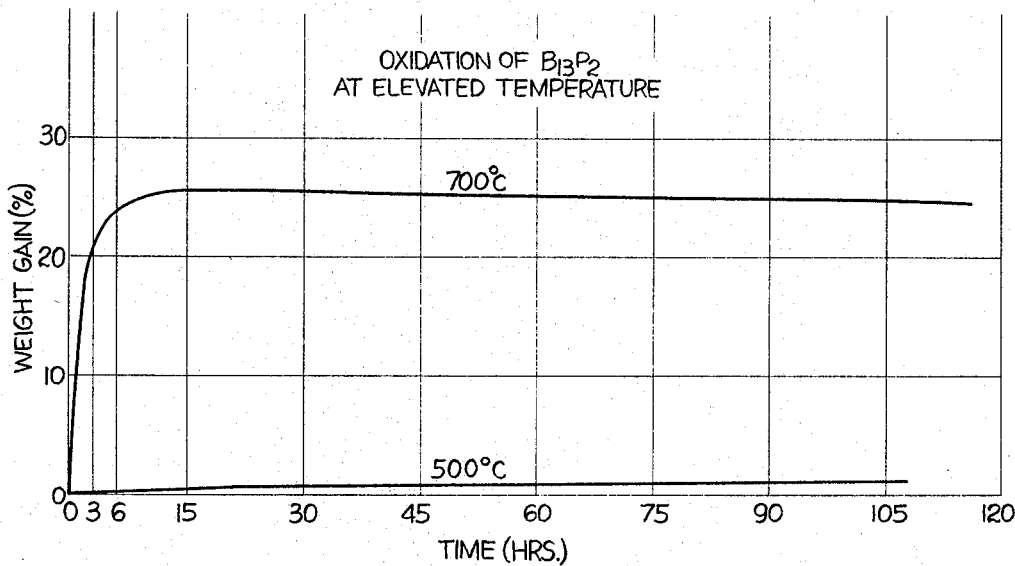

3,286,411
GRINDING WHEELS AND STONES OF OXIDE BONDED $B_{13}P_2$ AND METHOD OF PRODUCING SAME
James L. Peret, Milwaukee, Wis., assignor to Allis Chalmers Manufacturing Company, Milwaukee, Wis.
Filed Dec. 18, 1963, Ser. No. 331,439
7 Claims. (Cl. 51—307)

This invention relates generally to wear resistant bodies of $B_{13}P_2$. More particularly, this invention relates to grinding and surface finishing wheels and stones of oxide bonded $B_{13}P_2$ powders, and to a method for making such wheels and stones.

Originally, grinding or polishing stones were not artificially fabricated but were cut from natural sandstone quarried from natural beds of uniformly grained sandstone deposits. This procedure is still practiced to some extent today, but far more common are the fabricated stones and wheels produced from crushed, ground and bonded abrasive materials. Thus the most common practice today is to crush, grind and size known abrasive materials and then fabricate a uniform sized powder into the desired shape by using one of several adhesive or bonding materials.

There are about eight different types of adhesives or bonding materials used in the industry today. These are: (1) fused bonds, where the granular abrasives are partially fused together to form the desired wheel or stone; (2) cement bonds, where the abrasive grains are mixed and set in cement; (3) metallic bonds, where the abrasive grains are mixed with a molten metal and cast to form the desired piece; (4) resinoid bonds, where the abrasive is mixed with synthetic resins or plastics and the resin or plastic then cured; (5) rubber bonds, where the abrasive is mixed with rubber and molded before the rubber is vulcanized; (6) silicate bonds, where the grain is mixed with a waterglass solution cast into shape and baked for several days; (7) shellac bonds, where the abrasive grains are mixed with a liquid shellac and steam pressed to shape; and (8) vitrified bonds, where the grains are mixed with a ceramic material such as clay and then either pressed or molded into shape.

All of the above mentioned bonds are mechanical in nature, and all, with the exception of the fused bond, require the use of some form of fluid adhesive which is mixed with the abrasive grains and then solidified into the desired form. Furthermore, most of the above mentioned processes require elaborate pressing or heating equipment and may require several days of heating to effect the bond.

This invention is predicated upon my finding that a strong, hard abrasive body can be quickly produced without fusing, without high pressure molding and without the use of adhesives or binders; which possesses remarkably high strength properties in the bonded condition. The abrasive material used in this invention is a powdered or granular form of boron phosphide, $B_{13}P_2$, which I described in my copending joint patent applications, Serial Nos. 198,757 and now U.S. patent No. 3,251,651, and 232,243. In particular, those applications describe the abrasive qualities of the high temperature form of boron phosphide, $B_{13}P_2$, and methods for making this lower phosphide of boron.

Accordingly, it is a primary object of this invention to provide strong grinding and surface finishing wheels and stones which do not utilize adhesives or binders but rather are bonded by the thermal oxidation of the abrasive powder.

It is another primary object of this invention to provide a method for quickly fabricating such grinding and surface finishing wheels and stones, without fusion, without the use of adhesives or binders and without the use of elaborate pressing or heating equipment.

These and other objects and advantages are fulfilled by this invention as will become apparent from a full understanding of the following detailed description.

Figure 2:
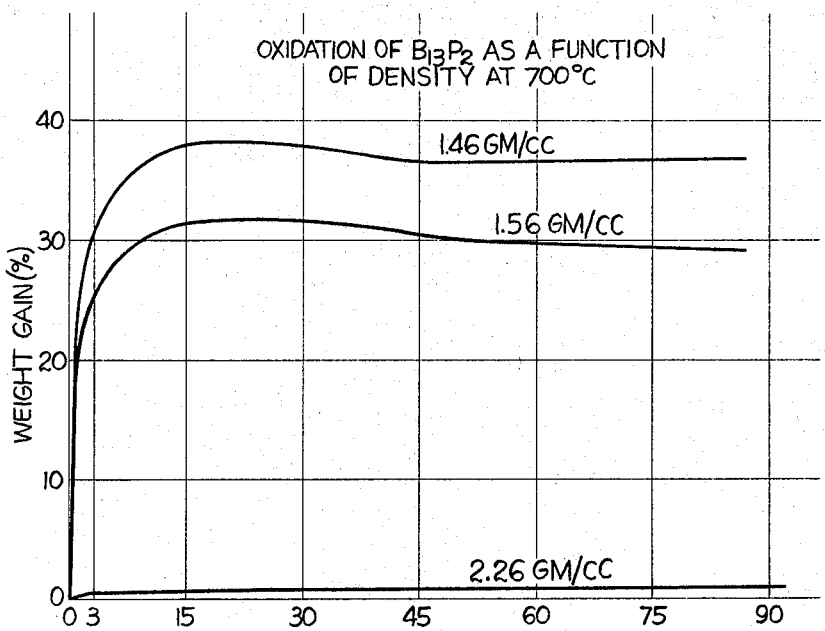

The drawings which form a part of the present patent application may be described as follows:

FIG. 1 is a graph which shows the variance in oxidation rate of $B_{13}P_2$ at two different elevated temperatures; and FIG. 2 is a graph which shows oxidation of $B_{13}P_2$ powder as a function of density of the molded powder form.

In my copending joint patent applications, Serial Nos. 198,757 and 232,243 the properties and production of $B_{13}P_2$ were described, and it was shown that $B_{13}P_2$ powder is an excellent abrasive material. Subsequently, I have found that when $B_{13}P_2$ is heated in the presence of an oxygen containing atmosphere, such as still air, a boron-phosphorus-oxygen phase forms on the surface of the particles. This oxide formation commences at a temperature of about 700° C. and proceeds to completion within 12 to 15 hours. The most surprising aspect of this discovery is that when a molded $B_{13}P_2$ powder form is sintered accordingly, the oxide phase will form a network about the particles strongly bonding the adjoining particles together to form a body which is as strongly bonded as the abrasive wheels and stones utilizing adhesives or binders. Thus by simply pressing $B_{13}P_2$ powder into the desired shape and sintering the shape at 700° C. for 12 to 15 hours, a hard, strong abrasive form can be produced.

In the past, I have attempted to sinter other well known abrasive materials into abrasive bodies without the use of permanent binders. In all cases attempted, however, a strong abrasive composite was not found. Instead the materials either decomposed, or remained unreacted until used to form extremely brittle glassy materials having no abrasive qualities. For example, powdered diamond decomposed to graphite and other boron compositions such as crystalline boron, boron carbide and boron silicide resulted in brittle glassy structures.

The oxide phase will commence to form at temperatures as low as 500° C., but at temperatures below 700° C. formation is slow. FIG. 1 shows a comparison of oxidation rates between 500 and 700° C. From FIG. 1 it is noted that at 700° C. oxidation is complete within 12 to 15 hours for a substantial weight gain of about 20 percent. On the other hand at 500° C., a similar sample having the same density had oxidized to a weight gain of only one percent in over 100 hours of sintering. Therefore, it is quite apparent that about 700° C. is a practical lower limit in the practice of this invention.

The oxide formation is only a surface reaction which proceeds to cover all of the exposed particle surfaces and thereafter protect the underlying $B_{13}P_2$ from further oxidation. Since the oxide formation is a surface reaction and dependent upon the extent of exposed surfaces, the amount of oxidation is dependent upon the grain size of the $B_{13}P_2$ particles used and upon the density of the molded form. At a given grain size, the degree of oxidation is inversely proportional to the density of the molded form being sintered. This is illustrated in FIG. 2 which is a graph showing weight gain per time as a function of density at a constant grain size. The weight gain in percent is shown for three representative samples having densities of 1.46, 1.52 and 2.26 gm./cc. The higher density body was hot pressed while the lower density bodies were cold pressed. These three samples displayed weight gains of about 37, 30 and 1 percent respectively at 700° C. for about 90 hours.

The grain size of the $B_{13}P_2$ powders to be used will of course be dictated by the coarseness of the abrading media desired. It is reasonable to expect, however, that coarser materials will display a lower weight gain during sintering due to the reduced total surface area of the particles.

The method used to mold the wheels or other forms is not of extreme importance. It is desirable however, to use some pressure forming means such as ordinary hot pressing in order to produce bodies having sufficient densities so that good strong bonds will result. Since the resulting density is a direct function of the pressure used in molding, there is no practical upper limit to pressure. Accordingly, proportionally higher pressures will give proportionally higher densities and therefore stronger bonds. However, good satisfactory bonds result with pressures obtainable with ordinary conventional pressing equipment. To exemplify, pressures on the order of 1000 p.s.i. and above should prove satisfactory. Thus, it is apparent that there are no critical limits as to the pressures to be used or the densities to be achieved. The ultimate strength desired will be controlling as to the method and pressures used.

I have found that it is also possible to slip cast the desired form. The $B_{13}P_2$ powder may be mixed with an organic binder such as acetone to form a slurry and then pouring the slurry into a mold. Upon subsequent sintering, the organic binder is burned out and the form oxidized. This method would have an advantage in that complex shapes could be produced where hot pressing or any hydraulic pressing could not be utilized. However, it would have the disadvantage in that high densities could not be achived for excessively strongly bonded bodies.

Grinding and finishing wheels produced in accordance with this invention required diamond core drills for boring a center hole on samples which were not molded with a center hole. The wheels were tested for wear resistance and strength under actual service conditions. The wheels were rotated at speeds up to 3,450 r.p.m. and used to grind and polish such materials as steels and tungsten carbide. The pressures applied against the wheels were hand applied and thus were not measurable. However, wheels used for one full hour at 3,450 r.p.m. were found to have a small reduction in diameter on the order of about 0.05 cm. A typical wheel reduced from 5.15 cm. to 5.10 cm. in one full hour of polishing at 3,450 r.p.m. This great amount of work at such slight expense to the wheel is an indication of the great bonding strength of the oxide phase.

The embodiments of the invention in which an exclusive property or privilege is claimed are defined as follows:

1. An abrasive article of manufacture comprising an object shaped from $B_{13}P_2$ particles pressed to form said object at pressures of about 1000 p.s.i. and then bonded together by an oxide phase resulting from the oxidation of the said $B_{13}P_2$ particles at temperatures of at least 500° C. but preferably about 700° C. and above.

2. An abrasive article of manufacture comprising an object shaped of uniformly sized $B_{13}P_2$ particles pressed to form said object at pressures of about 1000 p.s.i. and then bonded together by an oxide coating resulting from the oxidation of said $B_{13}P_2$ particles at temperatures of about 700° C. and above.

3. An abrasive wheel comprising a cylindrical shaped wheel of uniformly sized $B_{13}P_2$ particles pressed to form said object at pressures of about 1000 p.s.i. and then bonded together by an oxide phase resulting from the oxidation of the said $B_{13}P_2$ particles at temperatures of about 700° C. and above.

4. The method of making abrasive stones and wheels the steps comprising: forming the desired body by molding $B_{13}P_2$ particles at a compaction pressure of about 1000 p.s.i., and sintering the form for a period of about 10 to 15 hours at a temperature of about 700° C. and above in an atmosphere containing oxygen.

5. The method of making abrasive stones and wheels the steps comprising: forming the desired body from uniformly sized $B_{13}P_2$ particles at a compaction pressure of about 1000 p.s.i., and sintering the form at a temperature of about 700° C. or above and in an atmosphere containing oxygen for a sufficient time to cause an oxide phase to form covering the particles and bonding them together.

6. The method of making abrasive stones and wheels the steps comprising: pressing the desired body from uniformly sized particles of $B_{13}P_2$ at a pressure of about 1000 p.s.i. and sintering the molded form at a temperature of about 700° C. or above for a period of about 10 to 15 hours and in an atmosphere of air to cause an oxide phase to form over the said particles bonding them together.

7. The method of making abrasive bodies the steps comprising: forming a slurry of $B_{13}P_2$ powder in an acetone, pouring the slurry into a mold of the desired body, heating the mold and slurry to a temperature above 700° C. until the organic binder is burned out of the slurry and the $B_{13}P_2$ particles bonded together by an oxide phase and removing the resulting body from the mold.

References Cited by the Examiner

UNITED STATES PATENTS

| | | | |
|---|---|---|---|
| 2,966,426 | 12/1960 | Williams et al. | 23—204 |
| 2,984,577 | 5/1961 | Williams | 51—309 |
| 3,032,404 | 5/1962 | Douglass et al. | 51—307 |

ALEXANDER H. BRODMERKEL, *Primary Examiner.*

D. J. ARNOLD, *Assistant Examiner.*